March 3, 1970  E. H. SCHWARTZ  3,498,726
DEVICE FOR ATTACHING A SOAP CAKE OR THE LIKE TO AN APPLIANCE
Filed June 10, 1968  2 Sheets-Sheet 1

INVENTOR:
EDWARD H. SCHWARTZ,
BY Hood, Gust, Irish & Lundy
ATTORNEYS

March 3, 1970   E. H. SCHWARTZ   3,498,726
DEVICE FOR ATTACHING A SOAP CAKE OR THE LIKE TO AN APPLIANCE
Filed June 10, 1968   2 Sheets-Sheet 2
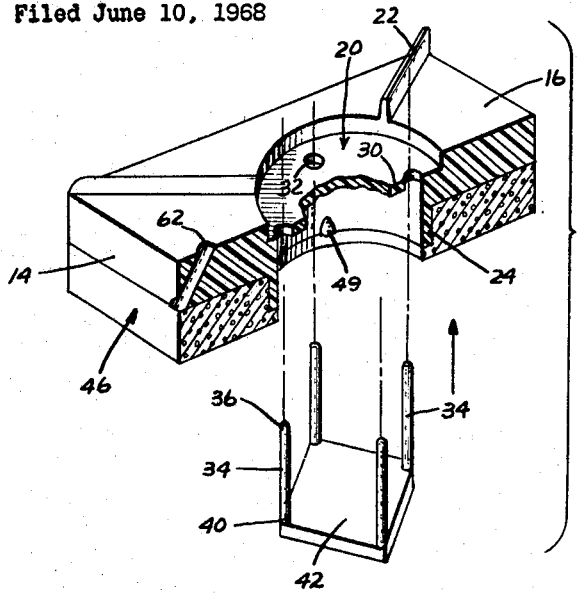
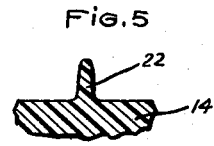
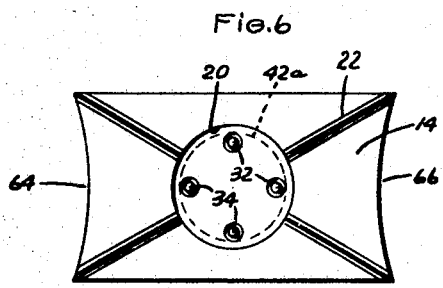
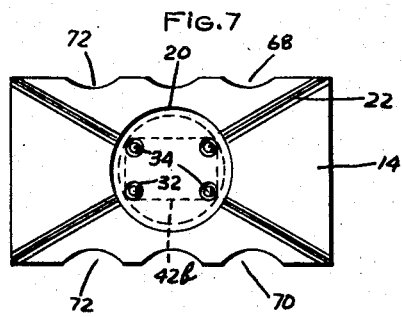
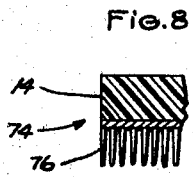
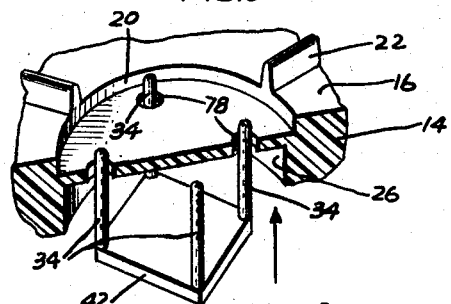
INVENTOR:
EDWARD H. SCHWARTZ,
BY Hood, Gust, Irish & Lundy
ATTORNEYS United States Patent Office 3,498,726
Patented Mar. 3, 1970

3,498,726
DEVICE FOR ATTACHING A SOAP CAKE OR THE LIKE TO AN APPLIANCE
Edward H. Schwartz, R.R. 4, Bluffton, Ind. 46714
Filed June 10, 1968, Ser. No. 735,819
Int. Cl. C11d 13/00
U.S. Cl. 401—19                    5 Claims

ABSTRACT OF THE DISCLOSURE

A device for attaching a cake of soap or other material to an appliance which includes a body having spaced top and bottom surfaces. A circular recess is formed in the top surface of the body and a cylindrical projection is formed on the bottom surface with a second circular recess formed in the projection coaxial with the first recess and extending into the body, the second recess being separated from the first recess by a partition. A plurality of apertures are formed in the partition communicating between the two recesses and a plurality of elongated prongs respectively extend through the apertures for movement transversely with respect to the top and bottom surfaces of the body. The prongs have distal ends which project upwardly and may project beyond the upper surface of the body. These ends are adapted to be pressed into a cake of material such as soap. The prongs have proximal ends in the second recess which are connected by a bridge member. A plurality of upwardly extending ribs are formed on the upper surface of the body respectively extending inwardly from the outer periphery thereof to the first aperture, these ribs being adapted to be pressed into the cake. An appliance, for example, a sponge, a brush, or the like is provided and secured to the bottom surface of the body portion and having a central aperture which snugly receives the body projection.

BACKGROUND OF THE INVENTION

Field of the invention

This invention relates generally to devices for attaching a cake of material, for example, soap, to an appliance.

Description of the prior art

Devices are known for holding a cake of soap or other similar material to an appliance. In one prior art arrangement, such a device is provided with a brush mounted thereon and a recess for accommodating a cake of soap and various configurations of sharp edges for gripping the cake. Yet another prior art arrangement provides a soap cake with a plurality of adjacent bores or sockets in which wash-cloth fibers or strands are positioned and anchored. However, no prior device known to the present applicant provides a device for attaching a cake of soap or similar material to an appliance which utilizes the unique structure disclosed herein for attaching a cage of the user's selection to an appliance until it is virtually entirely consumed.

SUMMARY OF THE INVENTION

The invention in its broader aspects provides a device for attaching a cake of material such as soap to an appliance. The device includes a body member having spaced top and bottom surfaces, the body has means projecting therefrom adapted to be pressed into the cake for retaining the same on the top body surface. Additional means is movably mounted within the body member for being pressed into the cake thereby further to retain the cake on the top surface of the body member. In the preferred embodiment of the invention, the body member has an aperture therein communicating with its top and bottom surfaces, and the movable means comprises at least one elongated prong movable in the aperture transversely of the top and bottom surfaces between upper and lower positions, the prong having an upward distal end adapted to be pressed into the cake, the prong moving downwardly in the aperture as the cake is consumed while still retaining the cake on the body member without appreciably protruding from the cake.

It is accordingly an object of the invention to provide an improved device for attaching a cake of material to an appliance.

Another object of the invention is to provide an improved device for attaching a cake of material, for example, soap, to an appliance which can be used with the caked material.

A further object of the invention is to provide an improved device for attaching a cake of soap or similar material of the user's selection to an appliance usable with the caked material and maintaining the cake attached to the appliance until the cake is substantially consumed.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 4 is a cross-sectional view in perspective, partially exploded, further showing the construction of the embodiment shown in FIG. 1;

FIG. 5 is a fragmentary cross-sectional view taken generally along the line 5—5 of FIG. 1;

FIG. 6 is a top view showing one modified form of the invention;

FIG. 7 is a top view showing another modified form of the invevntion;

FIG. 8 is a fragmentary cross-sectional view showing a further modified form of the invention; and FIG. 9 is a fragmentary cross-sectional view in perspective illustrating the embodiment of the invention shown in FIG. 1.

DESCRIPTION OF A PREFERRED EMBODIMENT

Figure 1:
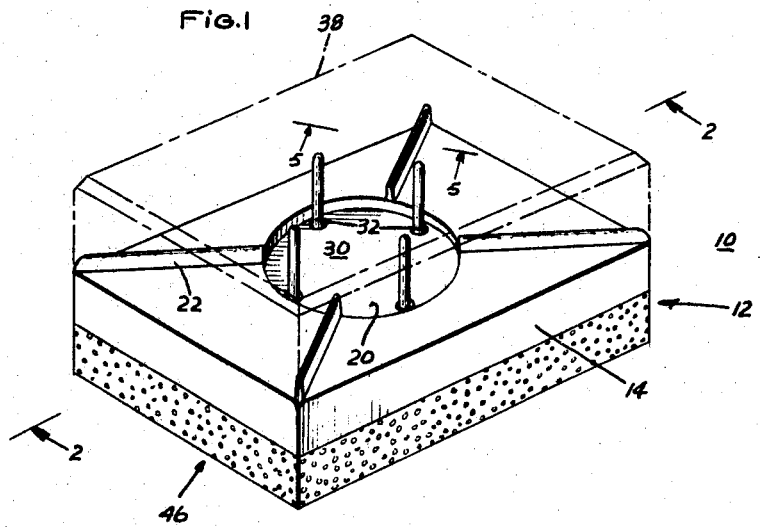
FIG. 1 is a view in perspective illustrating a preferred embodiment of the invention.

Referring now to FIGS. 1 through 5 of the drawings, the improved device of the invention, generally indicated at 10, comprises a hand grip member 12 which may be formed of suitable plastic material, such a polyvinylchloride. Hand grip member 12 includes a generally rectangular body portion 14 having spaced top and bottom surfaces 16 and 18. A shallow, cylindrical recess 20 is centrally formed in the top surface 16 of body portion 14. Four relatively blunt ribs 22 are formed on the top surface 16 projecting upwardly therefrom, ribs 22 extending radially inwardly, respectively, from the corners of the body portion 14 to the recess 20.

A cylindrical projection 24 is formed on the bottom surface 18 of the body portion 14 projecting downwardly therefrom and coaxial with recess 20. Projection 24 has a cylindrical aperture 26 formed therein extending upwardly from its bottom end 28 and coaxial with the recess 20.

Aperture 26 is separated from recess 20 by a relatively thin, transversely extending partition 30.

Figure 2:
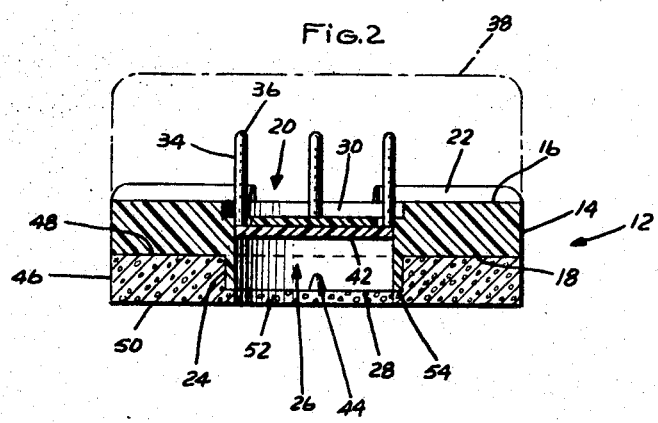
FIG. 2 is a side cross-sectional view taken along the line 2—2 of FIG. 1.

A plurality of spaced-apart apertures 32 are formed in partition 30 communicating respectively with the upper recess 20 and lower aperture 26. In the preferred embodiment, four apertures 32 are provided disposed in a square and equally spaced intermediate the inner ends of the four ribs 22. Four elongated, parallel, upstanding prongs 34 are provided movably extending upwardly through the respective apertures 32. Prongs 34 have upper distal ends 36 adapted to be pressed into the cake of soap 38, as will be hereinafter described. The lower proximal ends 40 of prongs 34 are connected by a bridging member 42 movably disposed in the lower aperture 26. In the preferred embodiment, prongs 34 and bridge member 42 are integrally molded of suitable plastic material, such as polyvinylchloride. It will be seen that engagement of the bridge member 42 with the bottom surface of the partition 30 defines the uppermost position for the prongs 34, as best seen in FIG. 2. One or more small indentations 44 formed inwardly from the inner wall of aperture 26 adjacent its bottom end 28 define stops for limiting the downward movement of bridge member 42 and prongs 34, thus defining the lowermost position of the prongs.

A generally rectangular sponge member 46 is provided conforming substantially to the size of the body portion 14 of the hand grip member 12. Sponge member 46 has spaced top and bottom surfaces 48 and 50. Sponge member 46 has its top surface 48 secured to the bottom surface 18 of the body portion 14 by a suitable non-water soluble adhesive. Sponge member 46 has a central aperture 52 which snugly receives and embraces the outer peripheral surface of projection 24 of hand grip member 12. In the preferred embodiment, the normal, uncompressed, thickness of sponge member 46 is greater than the axial length of projection 24 so that a portion 54 of sponge member 46 projects downwardly from the bottom end 28 of projection 24. Also, the projection 24 has relatively thin walls such that the member 46 resiliently expands to cover the bottom end, as best seen in FIG. 2. In the preferred embodiment, the sponge member 46 is formed of suitable closed-cell sponge material having generally the texture of a washcloth, such as ethylene propylene terpolymer sponge material.

The exterior dimensions of hand grip member 12 are preferably chosen generally to conform to the exterior dimensions of a new cake of commercially available soap as shown in dashed lines at 38 in FIGS. 1 and 2, however, it will be understood that the particular shape or configuration of the cake of soap is not critical. In use, the ribs 22 are pressed into one surface of the cake 38 so that that surface engages or is closely adjacent the upper surface 16 of the body portion 14. Ribs 22 thus serve to retain the cake 38 upon the upper surface 16 of the hand grip member 12, and particularly to inhibit lateral movement of the cake thereon. During this initial operation in which the ribs 22 are forced into the cake 38, distal ends 36 of the prongs 34 will engage the lower surface of the cake 38 thus moving the prongs and the bridge member 42 downwardly to their lowermost position in engagement with or adjacent indentations 44. Bridge member 42 serves as a manual actuating member and is then manually pressed upwardly thereby to cause the distal ends 36 of the prongs 34 to be pressed into the body of the cake 38. The length of the prongs 34 is preferably chosen so that the distal ends 36 penetrate generally half-way into a new cake of soap, as shown in FIG. 2.

It will be readily seen that the upper edges of the ribs 22 are rounded or blunted rather than being razor-sharp, and that the distal ends 36 of the prongs 34 are likewise rounded or blunt rather than being needle-sharp in order to prevent the ribs 22 or the prongs 34 from scratching the user. It will be further understood that the general properties and dimensions of the particular soap including its brittleness and thickness will determine the particular dimensions of the ribs 22 and prongs 34.

Figure 3:
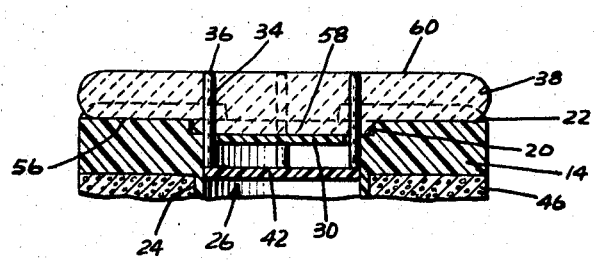
FIG. 3 is a fragmentary side cross-sectional view, again taken generally along the line 2—2 of FIG. 1, showing the device of the invention with a partially consumed cake of soap thereon.

After the cake of soap 38 retained on the hand grip member 12 as above-described has been used to some extent, a portion of its lower surface 56 will flow into the upper recess 20, as indicated at 58 in FIG. 3, thus further serving to retain the cake 38 upon the hand grip member 12. Further, as the cake is consumed resulting in reduction in its thickness and thus moving of its upper surface 60 closer to its lower surface 56, distal ends 36 of prongs 34 will eventually become flush with the upper surface 60. Thereafter, as consumption of the cake 38 continues, prongs 34 and bridge member 42 will move downwardly in the lower aperture 26, as further shown in FIG. 3. In this regard, I have found that the upper surface 60 of the soap cake 38 wears evenly rather than being rounded off toward the peripheral edges as in the case of conventional use of a soap cake. Also, I have found that the prongs never protrude so as to interfere with the use of the cake 38. As the cake 38 further is consumed, the ribs 22 will protrude from the cake surface 60. When this occurs, the ribs 22 function in the manner of a washboard to make lather.

Referring briefly specifically to FIG. 4, a small hole 62 may be formed in the body portion 14 for receiving a cord for hanging the device. Referring briefly to FIG. 6, ends 64 and 66 of the body portion 14, and the corresponding ends of the sponge member 46 may be slightly convexly curved inwardly, as shown, in order to facilitate gripping of the hand grip member. Further, while the bridge member 42 is shown in FIG. 4 as being rectangular, it may be of any desired shape, such as circular, as suggested in the dashed lines 42a in FIG. 6. Referring briefly to FIG. 7, the side edges 68 and 70 of the body portion 14 and the corresponding edges of the sponge member 46 may have indentations or scallops 72 formed therein again to facilitate gripping by the fingers. Further, while in the preferred embodiment shown in FIGS. 1 through 6, the prongs 34 and apertures 32 are equally spaced intermediate the inner ends of ribs 22, prongs 34 and apertures 32 may be radially aligned with the inner ends of the ribs 22, thus forming a rectangular pattern, and the bridge member 42 may likewise be rectangular, as suggested in dashed lines 42b.

Referring briefly to FIG. 8, a brush member 74 having rubber, plastic or natural bristles 76 may be substituted for the sponge member 46 of the previous embodiments. It will also be understood that the sponge 46 or brush member 74 may be eliminated entirely in which case the projection 24 would likewise be eliminated from the body portion 14 of the hand grip member 12.

Referring now briefly to FIG. 9, four prongs 34 have been shown in each of the embodiments and that number is preferred, it having been found that the employment of more than four prongs tends to crack or break the soap cake and less than four does not provide sufficient holding action, nevertheless it will be readily understood that for a particular size and configuration of soap cake, more or less prongs may be desired.

It will be seen that with the improved device of the invention, it is possible to use a cake of soap until it has been substantially entirely consumed. Further, when a cake of soap has been substantially consumed, it may merely be left on the device and a new cake placed thereover. Furthermore, the device does not require the use of a new cake of soap, but on the contrary, a smaller partially consumed cake may be used thereon. It will be observed that the user is not confined or restricted to any tially consumed cake may be used thereon. It will be observed particular make, size or configuration of soap cake, but may select any desired make, size or configuration. It will further be seen that the soap device of the invention can serve to space the soap from a wet supporting surface, such as a conventional soap dish, so that the soap does not become soft, and further that the sponge or brush members serve to inhibit the device from slipping from a wet surface, for example, wet vitreous china. It will be readily understood that the device may be provided with flotation properties so that it will float in a bathtub even though non-buoyant soap is employed therewith. Finally, while the invention has been described and illustrated as employed in connection with a soap cake, it will be readily apparent that it is equally usable with a cake of other materials formed into a cake or the like such as shoe polish, wax, and other materials.

In a specific embodiment of the invention made in accordance with FIGS. 1 through 5 of the drawings and usable with most cakes of hand soap, hand grip member 12 is three inches long, two inches wide, and three-eighths inch thick, and the sponge member 46 has the same length and width as the hand grip member 12 and is likewise three-eighths inch thick. Recess 20 is one and three-eighths inch in diameter and one-eighth inch deep. Aperture 26 is one and one-quarter inch in diameter. Partition 30 is 0.075 inch thick. Apertures 32 are 0.095 inch, prongs 34 have a diameter of 0.09 inch, a length of five-eighths inch, and a radius of 0.09 inch at the distal ends thereof. Bridge member 42 is 0.915 inch square and 0.125 inch thick. Ribs 22 are one inch long, 0.090 inch high, and 0.050 inch wide with a 0.025 inch radius at the upper ends thereof.

While there have been described above the principles of this invention in connection with specific apparatus, it is to be clearly understood that this description is made only by way of example and not as a limitation to the scope of the invention.

What is claimed is:
1. A device comprising a body, said body having a first surface, said body having a plurality of apertures therein, said apertures extending transversely of said first surface, means for attaching a cake of material to said body, said means including a plurality of projections on said first surface adapted to be pressed into a cake of material on said first surface, said projections extending from said first surface, said means also including a plurality of members movably positioned in said apertures, said members having portions thereof adapted to be pressed into a cake of material on said first surface, said members being movable in said apertures transversely of said first surface between upper and lower positions, said body including means for limiting the movement of said members between said positions.

2. The device of claim 1 wherein said appliance is formed of sponge-like material.

3. The device of claim 1 wherein said appliance comprises a brush.

4. A device comprising a body, said body having first and second surfaces, said body having a first recess formed in said first surface and a second recess formed in said second surface, a partition separating said first and second recesses, said partition having an aperture therein, means for attaching a cake of material to said body, said means including a projection on said first surface adapted to be pressed into a cake of material on said first surface, said projection extending from said first surface, said means also including a member movably positioned in said aperture, said member having a portion thereof adapted to be pressed into a cake of material on said first surface, said member being movable in said aperture transversely of said surfaces between upper and lower positions, said member in said lower position being in said first recess, said member in said upper position extending from said first surface, said body including means for limiting the movement of said member between said positions, and means in said second recess for moving said member.

5. The device of claim 4 wherein said appliance is secured to said second surface, said appliance extends from said second recess to the periphery of said second surface, whereby access to said moving means is provided.

References Cited
UNITED STATES PATENTS

| | | | |
|---|---|---|---|
| 1,117,634 | 11/1914 | Bowes | 401—19 |
| 1,275,456 | 8/1918 | Maher | 401—19 |
| 1,989,022 | 1/1935 | Perrichon | 401—19 |
| 2,131,500 | 9/1938 | Curtis | 401—19 |
| 2,431,913 | 12/1947 | Bowman | 401—19 |

LAWRENCE CHARLES, Primary Examiner